May 7, 1929.  A. G. RADKA  1,711,577
GRIPPING JAWS FOR TRUCKS
Filed May 14, 1926
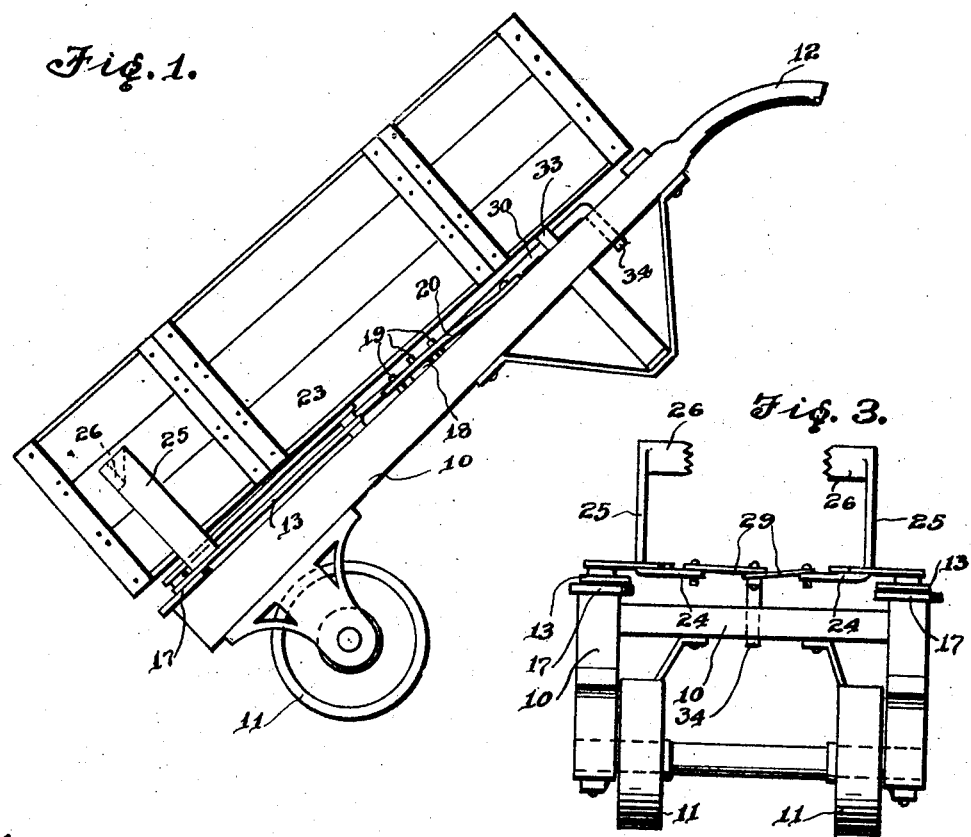
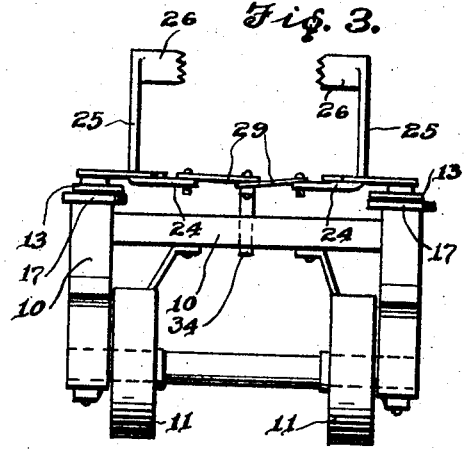
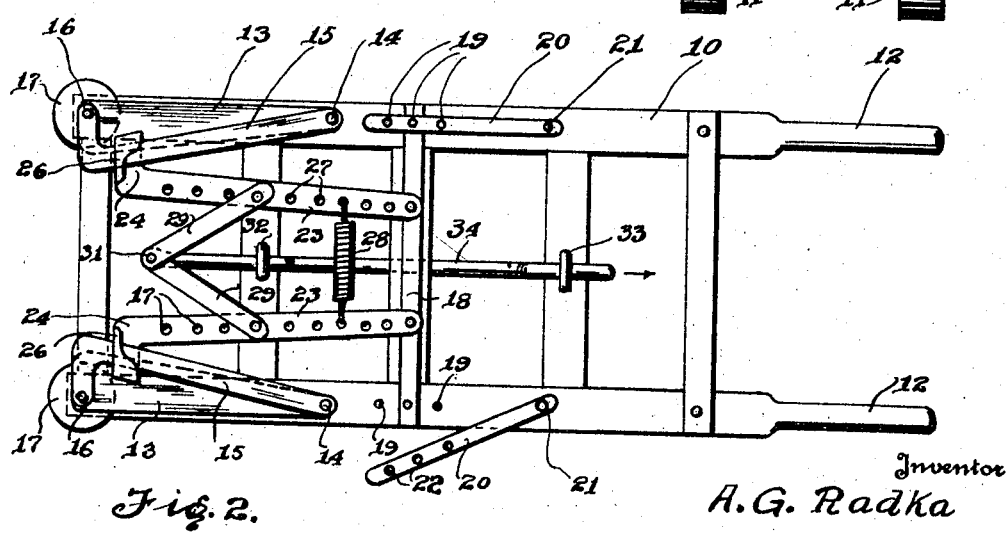
Inventor
A. G. Radka
By L. L. Morrill
Attorney Patented May 7, 1929.

1,711,577

UNITED STATES PATENT OFFICE.

AUGUST G. RADKA, OF NEWTON, KANSAS.

GRIPPING JAWS FOR TRUCKS.

Application filed May 14, 1926. Serial No. 109,095.

This invention relates to gripping jaws for trucks and has special reference to hand or manually-operated trucks for moving baggage, freight or the like and is directed to the jaws which are mounted upon or carried by the truck which grasp the load and retain it firmly in position and to the adjustability of such jaws.

A further object of the invention is to provide a truck having laterally and normally horizontally swinging jaws operated manually by the operator of the truck, which jaws grip upon opposite lateral sides of the load and retain such load against displacement while the truck and load are being moved.

With these and other objects in view, the invention comprises certain novel parts, elements, units, combinations, mechanical movements and functions as disclosed in the drawings together with mechanical and functional equivalents thereof as will be hereinafter more fully described and claimed.

In the drawings:

Figure 1 is a view in side elevation of a truck equipped with the gripping jaws of the present invention shown in operative relation to a load.

Figure 2 is a top plan view of the truck.

Figure 3 is a view of the truck in end elevation.

Like characters of reference indicate corresponding parts throughout the several views.

The present invention is applied to a truck of any usual and ordinary construction shown conventionally at 10 employing supporting wheels 11 and handles 12. The truck thus constructed is of a usual well known type for the handling of small or relatively small articles of merchandise or baggage.

The present invention is applied to the truck by applying to the cross bars wear strips 13 which are firmly bolted to the bars by bolts 14 which also firmly attach guides 15. At their opposite ends the wear strip 13 and guide 15 are secured by bolts 16 which serve also as journals for wheels 17 which protect surrounding articles from damage by the movement of the truck.

Extending across between the side bars of the truck is a cleat 18 secured to the side bars by means of pins 19 which permit the adjustment of this cleat 18. The number of pins shown in the drawings is only indicative and more or less may be employed as found necessary or desirable in the operation of the device. The cleat 18 is held adjustably in engagement with one pair of the pins 19 by a spring strip 20 upon each side which is pivoted to the cross bars as at 21 and is provided with a plurality of openings 22 corresponding to the pins 19 so that after the cleat has been positioned upon one pair of the pins 19 it is held adjustably in such position by the spring strips 20.

Pivoted to the cleat 18 are a pair of jaws 23 which extend toward the forward end of the truck and are curved outwardly as at 24 between the guide 15 and the wear strip 13. The outwardly turned ends 24 are then bent upwardly to form upwardly extending arms 25 terminating in inwardly turned gripping members 26. The particular form of these gripping members 26 is not limited to the exact tooth construction shown, but may be varied according to the use to which the truck is to be applied and includes any type of gripping members which will most efficiently and effectively grip and retain the load.

The jaws 23 are provided with a plurality of spaced perforations 27 between two of which extend a spring 28 tending to hold the gripping members 26 in engagement with the load after they have been moved into such engagement manually. The means for manually moving the gripping members into and out of engagement are a pair of toggle arms 29 pivoted at their ends in some of the perforations 27 and movable to others of said perforations for the purpose of varying the relation and movement of the jaws relative to the movement of the actuating rod 30 which is pivoted to the junction of the toggles 29, as at 31, and extends through guides 32 and 33 to be turned downwardly at 34 for the convenience of grasping in actuation.

In operating the device, the jaws will be adjusted to the particular work in which the truck is to be employed, such adjustment being by the movement of the cleat 18 upon the pins 19 and by the movement of the toggles 29 in the perforations 27. Such adjustment being acquired, the operating rod 30 is drawn toward the operator in the direction indicated by the arrow in Figure 2, thereby expanding the toggles 29 and the gripping jaws 23. The load is then applied to the truck or inversely the truck is applied to the load and the sliding rod 34 then pushed in the direction opposite the arrow in Figure 2, causing the gripping members 26 to engage the opposite sides of the load as indicated more particularly at Figure 1. This gripping being accomplished manually is maintained by the spring 28.

When the load is to be discharged, the gripping jaws are again diverged by the operation of the sliding bar 30 and toggles 29 which will release the gripping members 26 from their engagement with the load.

What I claim to be new is:

1. In a truck, side bars, a gripping organization carried by the side bars and comprising a cleat extending transversely between the side bars, jaws pivoted to the cleat to oscillate laterally relative to the side bars, means to fix the cleat to position the gripping organization as a unit at varied points longitudinally of the side bars, and an operating rod for and extending to a point remote from the jaws.

2. In a truck, side bars, a gripping organization carried by the side bars and comprising a cleat extending transversely across between the bars, jaws pivoted to the cleat to oscillate laterally relative to the side bars, a toggle introduced between and pivoted to the jaws, means to fix the cleat at varied points longitudinally of the side bars to position the gripping organization as a unit at varied longitudinal positions, and an operating rod pivoted to the toggle and extending to a point remote from the jaws.

3. In a truck, side bars, a gripping organization carried by the side bars and comprising a cleat extending transversely across between the bars, jaws pivoted to the cleat to oscillate laterally relative to the side bars, a toggle introduced between the jaws and provided with pivots adapted to engage the jaws at varying longitudinal points, means to fix the cleat at varying longitudinal points relative to the side bars to position the gripping organization as a unit at varying positions, and an operating rod pivoted to the toggle and extending to a point remote from the jaws.

4. In a truck, side bars provided with a plurality of upstanding pins, a gripping organization carried by the side bars comprising a cleat having apertures for engagement upon the pins, means carried by the side bars for holding the cleat in engagement with the pins, jaws pivoted to the cleat to oscillate laterally relative to the side bars, a toggle introduced between the jaws and provided with pivots adapted to engage the jaws at varying longitudinal points, and an operating rod pivoted to the toggle and extending to a point remote from the jaws.

In testimony whereof I affix my signature.

AUGUST G. RADKA.